United States Patent [19]

Hehr

[11] Patent Number: 4,488,735
[45] Date of Patent: Dec. 18, 1984

[54] COLLAPSIBLE LIGHTWEIGHT TRAILER

[76] Inventor: Herbert Hehr, 109 2nd Ave. SE., Kulm, N. Dak. 58456

[21] Appl. No.: 463,275

[22] Filed: Feb. 2, 1983

[51] Int. Cl.³ .............................................. B62D 63/06
[52] U.S. Cl. .................................. 280/656; 280/400; 280/789
[58] Field of Search ........... 280/400, 401, 402, 476 R, 280/656, 491 R, 491 A, 789

[56] References Cited

U.S. PATENT DOCUMENTS

| 1,860,518 | 5/1932 | Wells | 280/402 |
|---|---|---|---|
| 2,789,832 | 4/1957 | Zumwalt | 280/402 |
| 3,129,019 | 4/1964 | Bartone | 280/491 R |
| 3,625,545 | 12/1971 | Somers et al. | 280/400 |
| 3,690,482 | 9/1972 | Gaumont | 280/402 |
| 3,703,240 | 11/1972 | Russell | 280/402 |
| 3,817,556 | 6/1974 | Nyman | 280/400 |
| 3,997,186 | 12/1976 | Pottorff | 280/402 |
| 4,032,167 | 6/1977 | Chereda | 280/400 |
| 4,118,047 | 10/1978 | Neasham | 280/402 |
| 4,155,678 | 5/1979 | Lehman et al. | 280/402 |

FOREIGN PATENT DOCUMENTS

| 2333667 | 7/1977 | France | 280/400 |
|---|---|---|---|
| 2030933 | 4/1980 | United Kingdom | 280/400 |

Primary Examiner—Joseph F. Peters, Jr.
Assistant Examiner—Kenneth R. Rice
Attorney, Agent, or Firm—Harvey B. Jacobson

[57] ABSTRACT

Front and rear frame sections are provided with the front section including central and opposite side rearwardly diverging front frame members including forward ends anchored relative to each other and a laterally spaced apart rear ends. The rear section includes central and opposite side rearwardly divergent rear frame members including laterally spaced apart forward ends and rear ends removably supported from central and opposite end portions of a transverse axle assembly having ground engageable support wheels journalled from its opposite ends outwardly of the rear ends of the rear frame members. A trailer hitch assembly is carried by a forward portion of the front frame section and the front and rear ends of the rear and front frame members are removably telescopingly engaged with each other.

9 Claims, 5 Drawing Figures

COLLAPSIBLE LIGHTWEIGHT TRAILER

BACKGROUND OF THE INVENTION

Motorcycle trailers, and particularly those designed to carry a single motorcycle, are small and very low to the ground and are thus difficult to see by motorists when motorcycles are not supported therefrom. Accordingly, a trailered empty motorcycle trailer presents a road hazard which is not readily recognizable. In addition, when an empty motorcycle is being trailed behind a vehicle, the motorcycle cannot be seen by the driver of the vehicle and it is therefore very difficult to back up a vehicle having an empty motorcycle trailer coupled to the rear end thereof. Still further, vehicle parking, when a trailer is coupled thereto, is difficult and an empty motorcycle trailer hitched to a vehicle which is parked in a lot frequently can be damaged by other vehicles inasmuch as an empty motorcycle trailer is not readily viewable. Also, most drivers would rather drive a vehicle without a trailer coupled thereto, for obvious reasons.

Accordingly, a need exists for a motorcycle trailer which may be knockd down or collapsed when not in use and carried within the trunk compartment of a vehicle.

Various types of small lightweight trailers including some of the general structural and operational features of the instant invention such as those disclosed in U.S. Pat. Nos. 1,860,518, 2,789,832, 3,703,240, 4,118,047 and 4,155,678 heretofore have been provided. However, most of these previously known forms of trailers are not specifically designed to transport motorcycles and are not readily collapsible for storage within the tank compartment of a vehicle.

BRIEF DESCRIPTION OF THE INVENTION

The motorcycle trailer of the instant invention may be broken down into small components with a minimum of effort and without the utilization of tools. These various small components may be compactly stored within the trunk compartment of most passage vehicles of a size larger than a compact vehicle and the trailer has been designed in a manner such that its disassembled components may be constructed from readily available structural elements.

The main object of this invention is to provide a collapsible motorcycle trailer which, when collapsed, may be transported in a compact storage area such as the rear trunk area of a passage vehicle.

Another object of this invention is to provide a collapsible trailer whose components may be readily disassembled and reassembled without the use of tools.

Still another important object of this invention is to provide a collapsible trailer incorporating structure which will allow the motorcycle or other similar load to be securely supported therefrom.

A final object of this invention to be specifically enumerated herein is to provide a collapsible trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
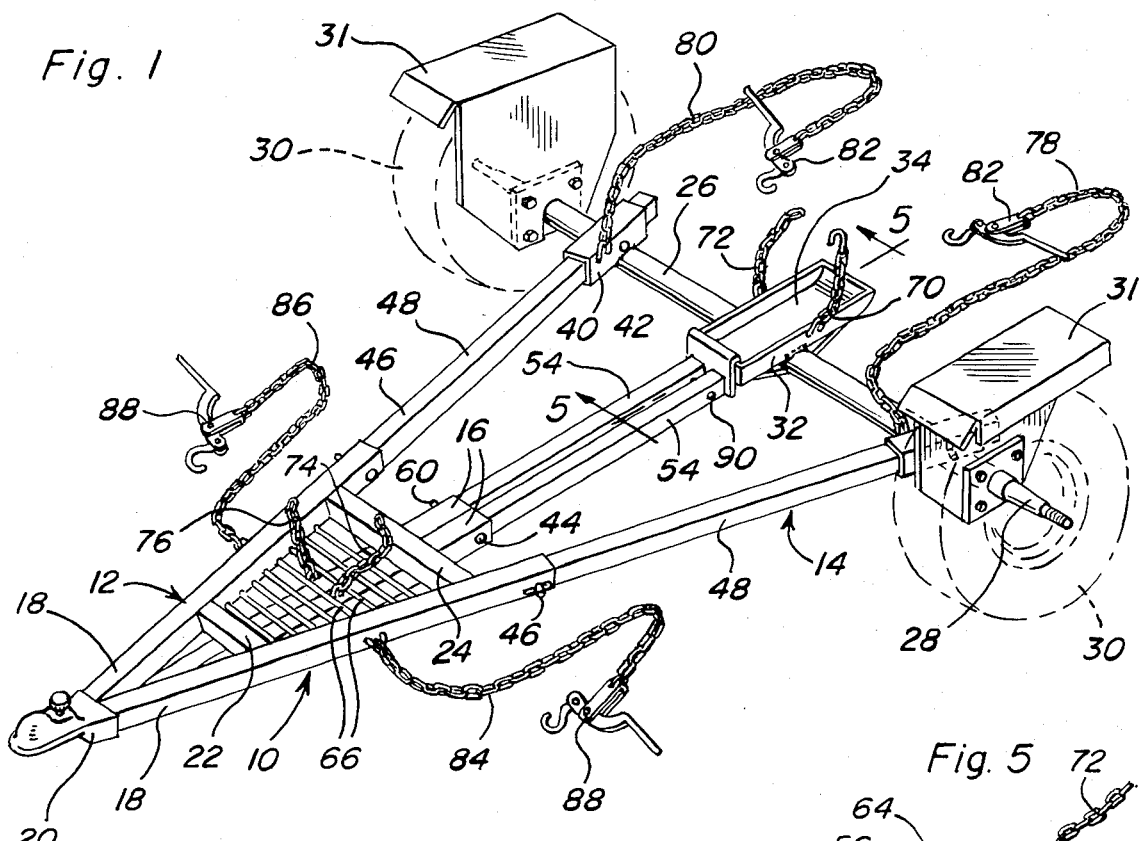
FIG. 1 is a perspective view of the collapsible trailer of the instant invention with the ground engaging support wheels thereof illustrated in phantom lines.

Referring now more specifically to the drawings, the numeral 10 generally designates the lightweight trailer of the instant invention. The trailer 10 includes front and rear frame sections referred to in general by the reference numerals 12 and 14. The front frame section includes a pair of side-by-side longitudinally extending central frame members 16 and a pair of opposite side rearwardly divergent frame members 18. The forward ends of the frame members 18 converge toward each other and are secured together in any convenient manner such as welding and support a trailer hitch coupler 20 therefrom. The frame members 16 are secured together and have their forward ends secured beneath the forward ends of the frame members 18. In addition, longitudinally spaced portions of the frame members 16 are secured to front and rear transverse frame members 22 and 24 extending and secured between corresponding longitudinally spaced portions of the frame members 18, the latter being rearwardly divergent. Also, it is to be noted that the frame members 16 and 18 are tubular and rectangular or square in cross-sectional shape.

The rear frame section 14 includes a transverse axle assembly 26 equipped with opposite ends wheel spindles 28 from which suitable wheels 30 may be removably journalled. In addition, the axle assembly 26 includes a pair of fenders 31 supported from corresponding ends of the assembly 26 as well as a central front-to-rear extending and upwardly opening wheel receiving well assembly 32. The wheel well assembly 32 defines an upwardly opening recess 34 in which to receive the rear wheel 36 of a motorcycle referred to in general by the reference numeral 38.

The rear frame section 14 also includes a pair of short forwardly convergent sleeves 40 secured to the upper surfaces of the opposite end portion of axle assembly 26 and the sleeves 40 are rectangular in cross section and include transverse locking pin receiving bores 42. In addition, the rear ends of the frame members 16 and 18 also include transverse locking pin receiving bores 44 and 46.

The rear frame section 14 further includes rear opposite side longitudinally extending frame members 48 each provided with transverse front and rear locking pin receiving bores and rear ends of the frame members 48 may be telescoped into the sleeves 40 and locked in position therein by transverse locking pins 50 secured through the bores 42 and the corresponding bores in the rear ends of the frame members 48. The forward ends of the frame members 48 are telescoped into the rear ends of the frame members 18 and locked in position therein by transverse locking pins 52 passed through the bores 46 and the transverse bores formed in the forward ends of the frame members 48. In this manner, the forward frame section 12 is operationally supported relative to the rear frame section 14.

Figure 5:
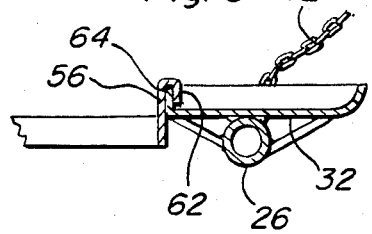
FIG. 5 is an enlarged fragmentary longitudinal vertical sectional view taken substantially upon the plane indicated by the section line 5—5 of FIG. 1.

The trailer 10 also includes a pair of rear central longitudinal frame members 54 which are secured relative to each other in slightly spaced parallel relation by a rear transverse plate 56 secured between the rear ends of the frame members 54 and the forward ends of the frame members 54 are provided with transverse locking pin receiving bores and telescopingly received within the rear ends of the frame members 16 and releasably secured in position relative to the frame members 16 by transverse locking pins 60 secured through the bores 44 and the transverse bores formed in the forward ends of the frame members 54. The transverse plate 56 defines a rear downwardly opening transverse channel 62 in which the forward upstanding transverse flange 64 of the wheel well assembly 32 is received for support of the rear ends of the frame members 54 from the central portion of the axial assembly 26, see FIG. 5.

Figure 2:
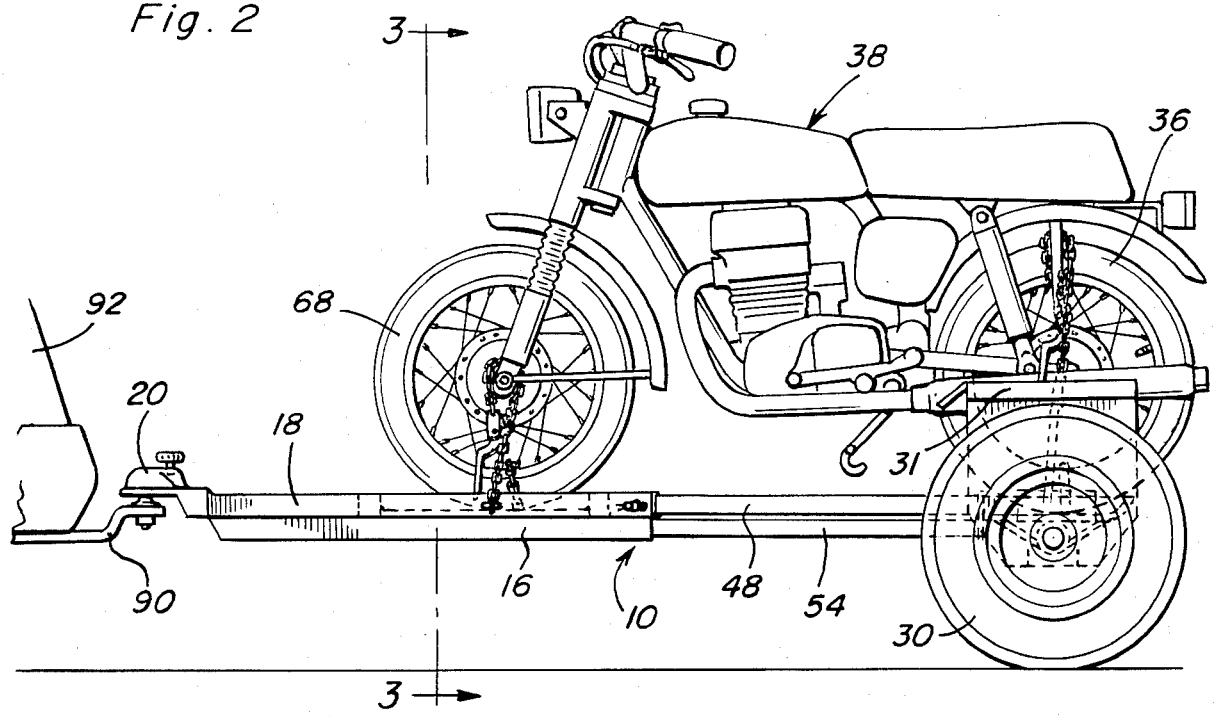
FIG. 2 is a side elevational view of the trailer coupled to the rear of a passager vehicle and with a motorcycle supported therefrom.
Figure 3:
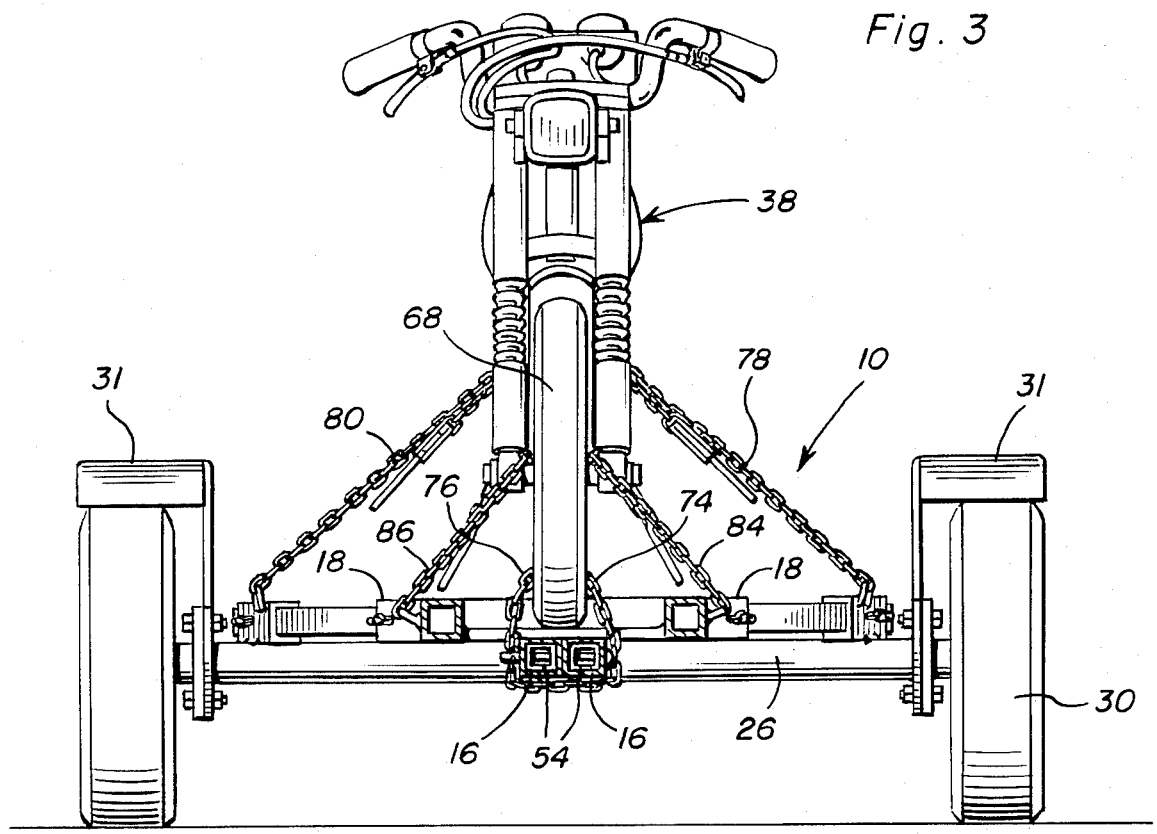
FIG. 3 is a enlarged transverse vertical sectional view taken substantially upon the plane indicated by the section line 3—3 of FIG. 2.

In addition to the wheel well assembly 32, the front frame section 12 includes a plurality of low horizontal transverse bars 66 disposed between the transverse frame members 22 and 24 and extending and secured between the rear end portions of the frame members 18. The bars 66 define a motorcycle front wheel support upon which the front wheel 68 of the motorcycle 38 may be supported in the manner illustrated in FIGS. 2 and 3 of the drawings.

The wheel well assembly 32 includes opposite side link chain sections 70 and 72 which may be secured together over the lower peripheral portion of the wheel 36 of the motorcycle 38 and the front frame section 12 includes similar link chain sections 74 and 76 which may be secured over the lower peripheral portion of the front wheel 68 of the motorcycle. In addition, the sleeves 40 support a pair of longer link chain sections 78 and 80 including tensioners 82 and the link chain sections 78 and 80 may be anchored about the upper peripheral portion of the rear wheel 36. Finally, the longitudinal midportions of the frame members 18 include link chain sections 84 and 86 including tensioners 88 and the link chain sections 84 and 86 may be anchored relative to the opposite ends of the axle for the front wheel 68 of the motorcycle 38. In this manner, the motorcycle 38 may be supported from the trailer 10 in a manner such that the sprung weight of the motorcycle is still supported from the springs thereof. Of course, the trailer 10 may be readily coupled to a suitable tow hitch 90 on a towing vehicle 92 in the manner illustrated in FIG. 2 of the drawings.

Figure 4:
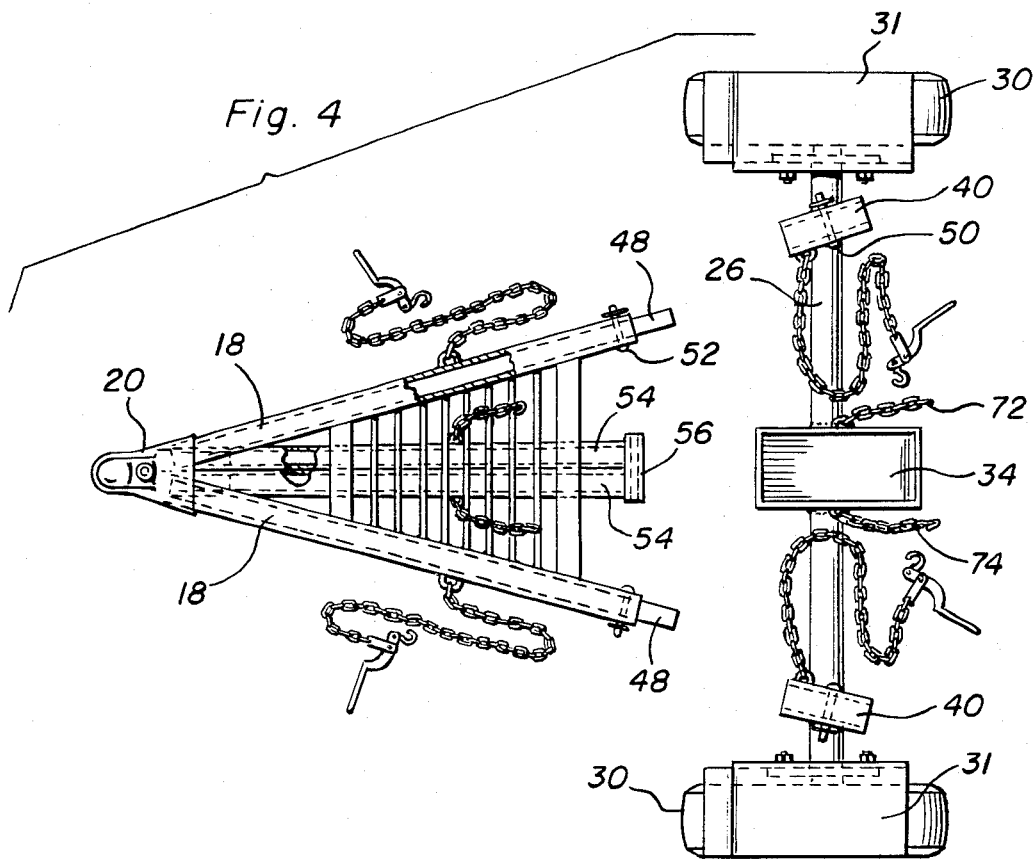
FIG. 4 is an exploded perspective view of the trailer in disassembled condition.

When it is desired to store the trailer 10 in a compact state after the motorcycle 38 has been removed therefrom, the pins 50, 52 and 60 may be removed and the frame members 48 may be stored within the frame members 18 and secured in position by the pins 52 passed through the transverse bores formed in the rear ends of the rear members 48. In addition, the frame members 54 may be stored within the frame members 16. In this manner, the trailer 10 is disassembled to the extent illustrated in FIG. 4 of the drawings and may be readily stored within the trunk compartment of the vehicle 92 or other storage space of similar size. When the frame members 54 are telescoped within the frame members 16, they may be secured in retracted position through the utilization of the pins 60 which are receivable through transverse bores 90 formed in the rear ends of the frame members 54.

Inasmuch as all of the frame members 18, 48, 22, 24 and 16 as well as the sleeves 40 are formed of square tubing, it may be appreciated that the motorcycle trailer 10 may be readily constructed at a low cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A collapsible lightweight trailer including front and rear frame sections, said front section including opposite side rearwardly divergent front frame members including forward ends anchored relative to each other and laterally spaced apart rear ends, said rear section including opposite side rearwardly divergent rear frame members including laterally spaced apart forward ends and rear ends supported from opposite end portions of a transverse axle assembly having ground engageable support wheels journalled from its opposite ends outwardly of the rear ends of said opposite side rear frame members, a trailer hitch assembly carried by the forward portion of said front frame section for removable coupling to a towing vehicle, the front and rear ends of said rear and front frame members being removably telescopingly engaged with each other, means releasably locking said telescopingly engaged frame member ends against disengagement from each other, the rear ends of said rear frame members being readily disengageably supported from the opposite end portions of said axle assembly, the opposite end portions of said axle assembly including forwardly convergent horizontal mounting sleeve members supported therefrom and open at their front and rear ends, the rear end portions of said rear opposite side frame members being removably telescopingly anchored within said sleeve members.

2. The collapsible trailer of claim 1 wherein substantially the full length of each of said rear opposite side frame members disposed forward of the corresponding sleeve member is forwardly retractable into the corresponding front frame member.

3. The collapsible trailer of claim 1 wherein the full length of each of said rear opposite side frame members disposed forward of the corresponding sleeve members are retractable through the corresponding sleeve member.

4. A collapsible lightweight trailer including central and front and rear frame sections, said front section including central and opposite side rearwardly divergent front frame members including forward ends anchored relative to each other and laterally spaced apart rear ends, said rear section including central and opposite side rearwardly divergent rear frame members including laterally spaced apart forward ends and rear ends supported from central and opposite end portions of a transverse axle assembly having ground engageable support wheels journalled from its opposite ends outwardly of the rear ends of said opposite side rear frame members, a trailer hitch assembly carried by the forward portion of said front frame section for removable coupling to a towing vehicle, the front and rear ends of said rear and front frame members being removably telescopingly engaged with each other, means releasably locking said telescopingly engaged frame member ends against disengagement from each other, the rear ends of said rear frame members being readily disengageably supported from the opposite end and central portions of said axle assembly, the opposite end portions of said axle assembly including forwardly convergent horizontal mounting sleeve members supported therefrom and open at their front and rear ends, the rear end portions of said rear opposite side frame members being removably telescopingly anchored within said sleeve members.

5. The collapsible trailer of claim 4 wherein a central portion of said front frame member and a central area of said transverse axle assembly include structure defining upwardly opening recesses for downwardly receiving the lower portions of the front and rear wheels of a motorcycle therein.

6. The collapsible trailer of claim 5 including adjustable length tension member means carried by the front and rear sections of said frame for securing a motorcycle in upright position on said trailer against lateral tilting or fore and aft shifting relative thereto.

7. The collapsible trailer of claim 4 wherein the full length of each of said rear opposite side frame members disposed forward of the corresponding sleeve members are rearwardly retractable through the corresponding sleeve member.

8. The collapsible trailer of claim 7 wherein substantially the full length of each of said rear opposite side frame members disposed forward of the corresponding sleeve member is forwardly retractable into the corresponding front frame member.

9. The collapsible trailer of claim 8 wherein substantially the full length of said rear central frame member disposed forward of said axle assembly is forwardly retractable into the corresponding front central frame member.

* * * * *